Oct. 17, 1950 — M. GRAVES — 2,525,895
WORLD TIME INDICATOR
Filed Aug. 5, 1947 — 2 Sheets-Sheet 1

INVENTOR:
MAITLAND GRAVES
HIS AGENT.

Oct. 17, 1950        M. GRAVES        2,525,895
WORLD TIME INDICATOR
Filed Aug. 5, 1947        2 Sheets-Sheet 2
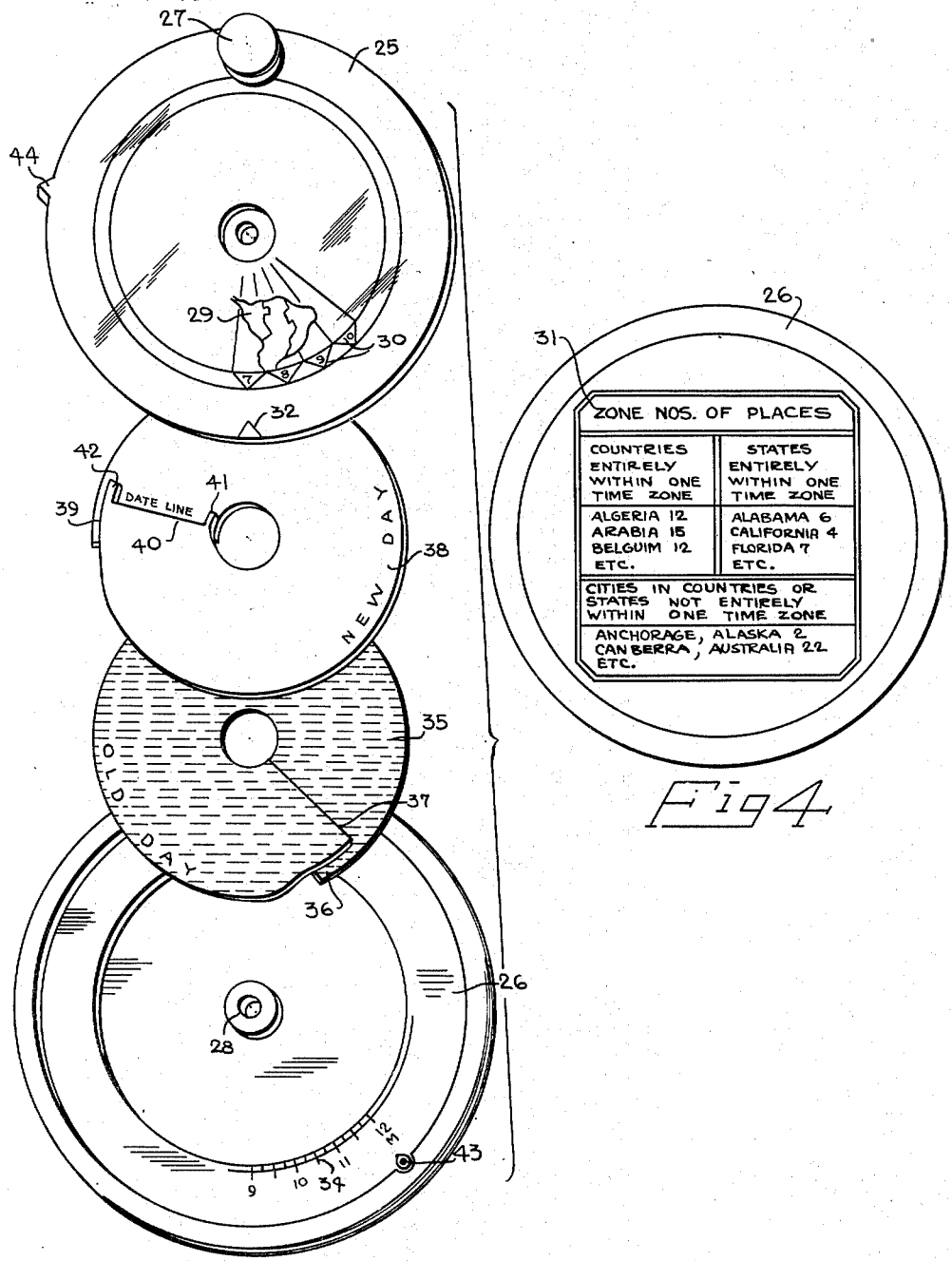
INVENTOR:
MAITLAND GRAVES,
BY
HIS AGENT.

Patented Oct. 17, 1950

2,525,895

UNITED STATES PATENT OFFICE 2,525,895

WORLD TIME INDICATOR

Maitland Graves, New York, N. Y.

Application August 5, 1947, Serial No. 766,327

4 Claims. (Cl. 35—44)

The invention relates to geography and relates more particularly to world time indicators.

Principal objects of the invention are to indicate simultaneously the corresponding zone or standard clock time, solar, or meridan time, and the day of all places in the world.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, one embodiment of the same being illustrated in the accompanying drawings and described in the specification.

The indicators will be valuable aids in education, in long range radio broadcasting and reception, in personal communications and business transactions by telephone, telegraph, or radio between persons in different time zones, and in air, railroad, and steamship travel.

The world time indicator is manually actuated with a mechanical device for showing corresponding days.

For a fuller understanding of the nature and objects of the invention, reference should be made to the following detailed description, taken in connection with the accompanying drawings, in which:

Fig. 3 is a disassembly view in parallel perspective;

Fig. 4 is an elevational view of the rear thereof; and

Figure 1:
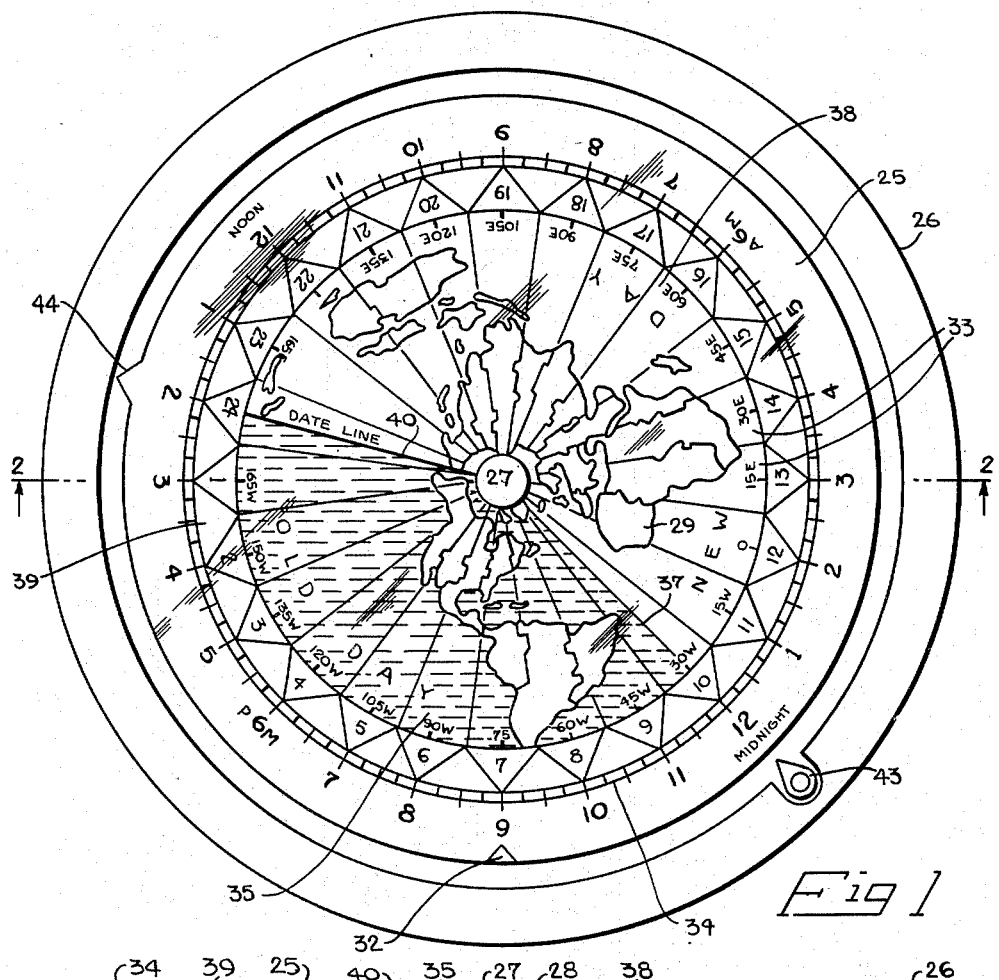
Fig. 1 is a plan view of a world time indicator constructed in accordance with the invention.
Figure 2:
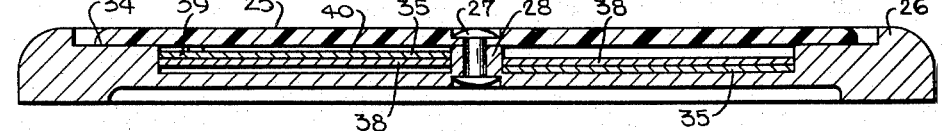
Fig. 2 is a sectional view taken along line 2—2 of Fig. 1.
Figure 5:
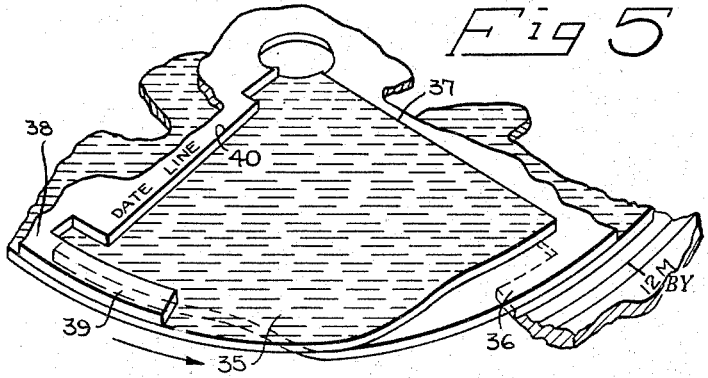
Fig. 5 is a fragmentary perspective view of the engaged day disks.

In carrying the invention into effect in the embodiment which has been selected for illustration in the accompanying drawings and for description in this specification, and referring now particularly to Fig. 1, a transparent map disk 25 is manually rotatable about its center at which point the map disk is secured on a circular stationary base 26 by an eyelet or rivet 27 which passes through a boss 28 that is integral with said base 26. Imprinted on the top or under the surface of the map disk is a radial north polar map 29 of the entire world. This gnomonic map 29 is a complete, continuous map of the whole world centered on the north pole.

Zone time is based on a division of the world by twenty-four standard meridians 15° apart in longitude, starting from the meridian of Greenwich. On the map 29 shown, these twenty-four standard meridians are the centers of the twenty-four numbered time zones, the numbering (from "1" to "24") designated 30.

By international agreement, all places in a time zone have the same clock time. The time in each zone differs by one hour from the adjacent zones. Adjacent time zone numbers 30 and adjacent land areas in different time zones may be differentiated by marking them alternately with contrasting colors (not illustrated in the drawings). On the map 29 shown, the coast lines and the irregularities of time zones (due to political boundaries) have been approximated for simplicity of schematic presentation.

A list 31 of countries and states with their time zone numbers is located on the underside of the base 26 and is supplied to aid, when necessary, in locating a place's position and time on the world time indicator. An arrow head 32, or other mark, quickly identifies the user's time zone on the map disk 25. On the circumference of the map 29 are marked degrees of longitude designated 33 to facilitate determination of solar time, as explained below. Thus the map 29, which is a flat polar representation of the globe, is provided with a plurality of different symbols, such as the International Date Line, meridians, degrees of longitude 33, time zones, and time zone numbers 30.

Imprinted on (or attached to), the base 26 is a time dial or time ring 34, concentric with the map disk, and divided into twenty-four divisions representing indications or indicia for the hours and for any desired fractional parts thereof. Numerical sequence on the time ring from one to twelve proceeds from west to east, as shown. the A. M. and P. M. numerical sequences may be differentiated by contrasting colors (not shown). If desired, hours may be marked from one to twenty-four, rather than marked in duplicate sequence from one to twelve as illustrated.

During one complete revolution of the earth (from west to east), two different days are current or exist simultaneously throughout the world. As shown in Fig. 1, the preceding or old day (Saturday for example), by international agreement, starts at the International Date Line or one hundred-eightieth (180th) meridian and extends eastward to 12 P. M. or midnight which is the end of the civil day. The succeeding or new day (Sunday in this example) starts at 12 midnight—at the "New Day Line"—and extends eastward to the International Date Line. At the moment in time illustrated in Fig. 1, it is still the preceding or old day (Saturday) in North and South America which are approaching the stationary New Day Line as the earth carries them eastward in its rotation. In the rest of the world, which has rotated past the New Day Line, it is the succeeding or new day (Sunday). As the earth continues its rotation eastward, the International Date Line will again reach the 12 midnight or "New Day Line" completing one twenty-four hour cycle.

In the embodiment illustrated in Figs. 1, 2, 3, 4 and 5, two radially slit disks of different colors are employed to illustrate this cycle and to indicate the preceding-succeeding day relation existing at all parts of the world at any moment in time. An "old day" disk 35, which may be a gray cardboard, plastic or metal stamping, is cemented or riveted to the base 26 at its tab 36 with its slit 37 including a radial edge thereof aligned with 12 midnight. A second disk, the "new day" disk 38, which may be a white cardboard, plastic or metal stamping, is cemented or riveted to the underside of the map disk 25 at its tab 39, with its slit 40 including a radial edge thereof aligned with the one-hundred-eightieth meridian or International Date Line. When the slits 37 and 40 of the disks are meshed or engaged and the disks rotated, they operate as helices or spiral threads of a screw. Each disk 35 and 38 has a central hole that fits and surrounds said boss 28. Consequently, when the map disk 25 with the attached new day disk 38 is rotated eastward, the new day disk 38 will progressively overlap the old day disk 35 and illustrate the twenty-four hour cycle previously described. Tabs 41 and 42, on the new day disk 38 prevent jamming of the new and old day disks by facilitating engagement of their slits. A movable stop arm 43 is pivoted to the base 26 for engaging a stop stud 44 that is connected to said map disk 25, to limit rotation of the map disk in either direction to one revolution, thus preventing disengagement of the day disks. The stop arm 43 is disposed in a recess on the base 26 and is forced by the stud 44, upon contact, into abutment with the recess walls, thus permitting a complete rotation of the map disk 25 in either direction.

If desired, laminated helices or extruded plastic helices may be substituted for the disks.

Operation of the world time indicator embodiment is as follows: The user first ascertains the current time in his zone by referring to his watch or clock and then rotates the map disk 25 until his time zone number 30 is set opposite that particular time on the time ring 34. He then reads the corresponding standard clock time and day of any other place in the world opposite its time zone number 30. As shown in Fig. 1, for example, when it is 9 P. M. Saturday (the preceding or old day) in New York (Time Zone "7")—it is 11 A. M. Sunday (the succeeding or new day) in Japan (Time Zone "21"). The user may also read the solar time of any place in the world opposite its meridian. For example, with the indicator set above, the solar time of Yokohama, and all other places located on the one-hundred-fortieth meridian east of Greenwich, is 11:20 A. M.

Having described and illustrated a certain form of the World Time Indicator, I wish it to be understood that this instrument is not to be limited to the specific form or arrangements of parts herein described and shown. Numerous changes in the shape, size, position, and materials may be made without departing from the principle, scope or intention of the invention. In addition to the forms described and illustrated, the World Time Indicator may consist of numerous combinations of the following variations. A disk with a north or south polar world map showing twenty-four numbered or unnumbered time zones—or a disk bearing time zone numbers only. The time zone map or time zone numbers may encompass a centrally located time ring—or the time ring may encompass the map or zone numbers. The time zone map or time zone numbers may be above or beneath the time ring. The indicator may also comprise another globe representation, for instance be built in the form of a terrestrial globe showing a map of the world with its standard time zones and encompassed by a time ring.

In the foregoing, it has been assumed that the polar map is manually movable and the time ring either fixed or driven mechanically, but it will be understood that the positions thereof relative to motion may be interchanged without departing from the aim and scope of the invention.

It is accordingly desired that in construing the breadth of the appended claims they shall not be limited to the specific exemplifications of the invention described therein.

Having thus described the invention, what I claim as new and desire to be secured by Letters Patent, is as follows:

1. In a world time indicator including a stationary base, in combination with, three superposed concentrically and substantially coextensively arranged members comprising a stationary member and a rotatable member supported on said base, one of said last named members including a polar map having an indication for the International Date Line, the other of said last named members including a time ring having an indication for Midnight, said stationary member having a slot coinciding with an indication, and a revoluble helical member threaded through said slot and having a portion extending above said stationary member and including a radial edge coinciding with the other indication, said helical member being connected to said rotatable member for movement therewith to cover and to uncover with said portion successive areas of the stationary member for indicating in the sector formed between said indications the extent of the New Day, the topmost member being transparent to expose the member immediately below whereby the globular extent of the New Day for a selected time and geographical location will appear in superposition with said polar map.

2. In a world time indicator as claimed in claim 1, in combination with, said polar map having time zones and peripherally arranged time zone numbers.

3. In a world time indicator as claimed in claim 1, in combination with, stop means to limit rotation of said revoluble members in either direction.

4. In a world time indicator as claimed in claim 1, characterized therein that said polar map is on the topmost member that is rotatable and transparent, said helical member is disposed immediately below the map carrying member, and the time ring is on the lowermost stationary member.

MAITLAND GRAVES.

REFERENCES CITED

The following references are of record in the file of this patent:

UNITED STATES PATENTS

| Number | Name | Date |
|---|---|---|
| 635,268 | Osse | Oct. 17, 1899 |
| 1,141,070 | Miller | May 25, 1915 |
| 2,418,756 | Christy | Apr. 8, 1947 |